(12) United States Patent
Alonso Sastre et al.

(10) Patent No.: US 9,186,826 B2
(45) Date of Patent: Nov. 17, 2015

(54) PROCESS FOR OBTAINING A THERMOPLASTIC MATERIAL PRODUCT, AND THE CORRESPONDING PRODUCT

(75) Inventors: Carlos Alonso Sastre, Burgos (ES); Alberto Sanchez Lite, Burgos (ES); Jesus Poveda Bernal, Burgos (ES); Ignacio Gonzalez Rodriguez, Burgos (ES)

(73) Assignee: GRUPO ANTOLIN-INGENIERIA, S.A., Burgos (ES)

( * ) Notice: Subject to any disclaimer, the term of this patent is extended or adjusted under 35 U.S.C. 154(b) by 542 days.

(21) Appl. No.: 12/175,406

(22) Filed: Jul. 17, 2008

(65) Prior Publication Data
US 2009/0072440 A1 Mar. 19, 2009

(30) Foreign Application Priority Data

Jul. 18, 2007 (ES) .................................. 200701999
Dec. 28, 2007 (EP) .................................. 07380399

(51) Int. Cl.
| | |
|---|---|
| *B29C 43/18* | (2006.01) |
| *B29C 31/04* | (2006.01) |
| *B29C 31/08* | (2006.01) |
| *B29C 43/34* | (2006.01) |
| *B29K 105/06* | (2006.01) |
| *B29K 105/00* | (2006.01) |
| *B29L 31/30* | (2006.01) |

(52) U.S. Cl.
CPC ............... *B29C 43/183* (2013.01); *B29C 31/04* (2013.01); *B29C 31/08* (2013.01); *B29C 43/34* (2013.01); *B29K 2105/06* (2013.01); *B29K 2105/256* (2013.01); *B29L 2031/3041* (2013.01)

(58) Field of Classification Search
CPC ........................................................ B29C 43/18

USPC .................................................. 264/265, 320
See application file for complete search history.

(56) References Cited

U.S. PATENT DOCUMENTS

| | | | | |
|---|---|---|---|---|
| 3,758,060 A | * | 9/1973 | Schuplin | 248/74.3 |
| 4,571,320 A | | 2/1986 | Walker | |
| 4,971,544 A | * | 11/1990 | Schneeberger | 425/258 |
| 5,626,382 A | * | 5/1997 | Johnson et al. | 296/146.7 |

(Continued)

FOREIGN PATENT DOCUMENTS

| | | |
|---|---|---|
| DE | 3642063 | 7/1987 |
| DE | 19922202 | 11/2000 |

(Continued)

OTHER PUBLICATIONS

Derwemt abstract of FR2850898.*

*Primary Examiner* — Christina Johnson
*Assistant Examiner* — Xue Liu
(74) *Attorney, Agent, or Firm* — Florek & Endres PLLC

(57) ABSTRACT

The invention relates to a process for the manufacture of thermoplastic resin parts, comprising the steps of:
a) introducing a thermoplastic material (2) in a cavity (11) of a mold (1);
b) closing the mold (1), compressing and distributing the thermoplastic material (2);
c) opening the mold (1) and removing the obtained product.
Step a) comprises the steps of
 a1) depositing the thermoplastic material (2) on a carrier support (4);
 a2) moving the carrier support towards the cavity of the mold;
 a3) depositing the thermoplastic material (2) inside the cavity of the mold.

34 Claims, 20 Drawing Sheets

(56) References Cited

U.S. PATENT DOCUMENTS

| | | |
|---|---|---|
| 6,224,363 B1 | 5/2001 | Mahan et al. |
| 6,264,462 B1 * | 7/2001 | Gallagher ............ 425/574 |
| 6,796,788 B2 * | 9/2004 | Gallagher ............ 425/574 |
| 6,852,268 B1 | 2/2005 | Valyi et al. |
| 2002/0149133 A1 * | 10/2002 | Visconti ............ 264/248 |
| 2003/0143373 A1 * | 7/2003 | Bledsoe et al. ........ 428/138 |
| 2006/0019514 A1 * | 1/2006 | Sekiya ............ 439/76.2 |
| 2006/0093692 A1 * | 5/2006 | Miyajima et al. ...... 425/129.1 |
| 2006/0138689 A1 * | 6/2006 | Endrud et al. ........ 264/40.4 |

FOREIGN PATENT DOCUMENTS

| | | |
|---|---|---|
| DE | 10253830 | 6/2004 |
| EP | 1529618 | 5/2005 |
| JP | 56078953 | 6/1981 |
| JP | 3009836 | 1/1991 |
| JP | 2001301074 | 10/2001 |
| JP | 2003039580 | 2/2003 |
| JP | 2006289651 | 10/2006 |
| WO | WO95/01248 | 1/1995 |

\* cited by examiner

PROCESS FOR OBTAINING A THERMOPLASTIC MATERIAL PRODUCT, AND THE CORRESPONDING PRODUCT

CROSS-REFERENCE TO RELATED APPLICATIONS

The present application claims the benefit under 35 U.S.C. 119(a)-(d) of Spanish Patent Application No. P200701999, filed on Jul. 18, 2007, and European Patent Application No. 07380399.1, filed on Dec. 28, 2007, the entire content of each of which is incorporated herein by reference.

TECHNICAL FIELD OF THE INVENTION

The invention is comprised in the field of the manufacture of thermoplastic resin parts, for example, for their use as automotive vehicle components.

BACKGROUND OF THE INVENTION

In a conventional injection molding process, the thermoplastic resin is injected at high temperature and high pressure in a closed mold, allowing complex shapes to be obtained. With these high pressure and temperature injection techniques, very compact and very rigid parts can be obtained, so many times reinforcing elements are not needed. These processes allow introducing inserts or decorative linings inside the mold.

Nevertheless, these injection processes have certain drawbacks, for example:
  It is necessary to use high quality materials to reach the required mechanical and/or structural characteristics, as well as the desired external appearance. Many times it is not possible to use recycled or low quality materials.
  It is necessary to closely control the temperature so that the material flows well. When plastic cools it contracts, so it is necessary to closely control the temperature, especially when trying to obtain complex shapes.
  The high temperature involves enormous energy consumption. The required facility furthermore is more complex since it must be able to heat the material at that high temperature. In addition, when the use of inserts or reinforcements introduced in the mold is required or when the part to be obtained must incorporate a lining, it is necessary to take into account that not all the materials used to form inserts, reinforcements or linings can withstand these high temperatures.
  The injection nozzle is in a specific area of the mold, therefore in order to reach the most distant areas and/or areas with complex shapes, the material has to flow very well. In order to obtain completely filling the mold and a good packing of the material (which allows improving the mechanical and structural behavior of the obtained part), it is necessary to use high pressures. These necessary high pressures make a more complex facility necessary.
  In some cases (as in the case of roof panels or door panels for automotive vehicles), the plastic part must incorporate a lining layer on at least one of the two faces of the obtained part (generally arranged on the "visible face", i.e. on the face of the product that is visible to the user during conventional product use). In order for this lining layer to adhere to the plastic part, the lining layer is generally placed in the mold and then the thermoplastic material is injected. This has the drawback that it is not possible to use any lining material since many materials may degrade (for example due to burning or glares which deteriorate their appearance or involve the loss of their initial properties) due to the high temperatures of the injection. It is therefore occasionally necessary to use a complementary protection layer that is placed between the lining layer and the surface of the thermoplastic material and functions as insulation against the high temperature of the injection process, to prevent deterioration of the lining layer. However, this increases the complexity and increases the final cost of the process. Furthermore, the use of the complementary protection layer is sometimes not enough to completely solve these problems, which may require the use of special (and/or expensive) materials for the lining layer.

The high pressure of the injection may further break the lining material.

The movement of the plastic material flowing from the injection nozzle throughout the mold may furthermore cause the lining layer to move, wrinkle or become detached, dragged by the movement of the plastic material, possibly changing the final appearance of the part.

The injection processes can be carried out in a closed mold or in an open mold (in which case the injection is carried out in two steps: first part of the material is injected with the mold open, then the mold is closed and the injection is then finished).

Another technique that can be used for producing thermoplastic parts is called open mold compression. This technique is traditionally based on introducing the plastic material in an open mold, closing with the corresponding upper mold and applying a closing pressure. In this technique, the pressures are not as high as in injection molding processes, and the plastic material is usually at a lower temperature than the temperature used in injection processes.

These open mold compression techniques therefore have a series of advantages over injection processes, for example:
  i) Open mold compression techniques allow the use of a wider variety of plastic materials than injection processes. Many non-suitable or completely inappropriate materials can be used for an injection process.
  ii) They do not require cycle temperatures as high as in injection processes and, therefore, the energy consumption is lower, the required facilities are less complex and a much wider variety of materials can be used for inserts, reinforcements or lining layers.
  iii) The plastic material is not as hot, therefore the stabilization of the part requires less time, which results in higher productivity. This also means that greater control over the quality of the parts is obtained or, in other words, for the same cycle time, the stabilization is greater and therefore better parts are obtained.
  iv) Furthermore, due to the use of lower temperatures and pressures, the risk of defects in the lining is reduced. With high temperatures, the thermoplastic material can, for example, pass through the pores of the lining or cause tears in the lining in which the thermoplastic material could enter.
  v) Many times it is not necessary to use a complementary protection layer.
  vi) The facilities or tools used in these processes can be simpler and smaller than those used in injection processes.
  vii) The use of lower temperatures can be useful for reducing cycle times.

Nevertheless, these open mold compression techniques have the drawback that the metering machine causing or generating the melted or softened thermoplastic material is usually a very large and heavy machine, which cannot be easily moved for pouring the plastic material into the cavity of the mold. It is certain that perhaps it is not necessary to move the entire machine: this type of machine can incorporate, for example, thermoplastic material feed hoppers, thermoplastic material heating means and other devices that do not have to be moved and, furthermore, an arm by means of which the thermoplastic material is introduced in the mold, which arm generally incorporates heating means to prevent the material from cooling down and a thermoplastic material driving system, for example a worm screw. However, this arm would have to move and would still be a very large and heavy element. Furthermore, the mold generally incorporates guiding columns making it difficult for the arm of the metering machine to access the cavity of the mold to be filled with the thermoplastic product (the columns are usually arranged between the lower part and the upper part of the mold so as to allow the guided movement of the upper part for the pressure closing of the mold).

These open mold techniques further have the drawback that the forming pressure is the closing pressure of the mold and the temperature of the thermoplastic material is lower than the temperature used in the injection process, therefore a poor filling of the mold may occur (for example, if the material is very cold, even though it exerts pressure, the material does not completely fill the mold) and the obtained part may be less packed than when using injection techniques and, therefore, have worse mechanical characteristics. This means that to obtain parts with similar features as those obtained by injection, the parts must incorporate reinforcing members.

These reinforcing members can consist of, for example, meshes or screens which are placed inside the open mold, then introducing the plastic material in the mold on the screen or mesh.

There are a number of publications reflecting processes for obtaining products comprising reinforcing members such as meshes or screens, for example, DE-A-19922202, DE-A-3642063, US-A-2002/0035796, EP-A-1529618, JP-A-2006-289651, JP-A-3-009836, US-A-5135694, JP-A-2003-039580, JP-A-56-078953 and JP-A-2001-301074.

DESCRIPTION OF THE INVENTION

A first aspect of the invention relates to a process for the manufacture of thermoplastic resin parts, comprising the steps of:

a) introducing a thermoplastic material comprising at least one thermoplastic resin in a cavity of a mold (for example, a mold comprising a first part and a second part functioning as a cover, and forming, between said two parts, a cavity the shape of which determines the shape of the object obtained in the process);

b) closing the mold, compressing and distributing the thermoplastic material inside the cavity of the mold;

c) opening the mold and removing a product, obtained from said thermoplastic material, from the cavity of the mold (logically, the mold is normally opened, as is usual, after suitable cooling and stabilization of the part obtained in the closed mold).

According to the invention, step a) comprises the steps of:

a1) depositing the thermoplastic material in softened state on a carrier support (softened state is understood as the state of the thermoplastic material at the output of a thermoplastic material metering or extrusion machine; it is not necessarily a completely liquid state but, for example, a more or less pasty or plasticized state, which makes handling the material easier and prevents the use of very high temperatures);

a2) moving the carrier support, with the thermoplastic material, towards the cavity of the mold (i.e. the carrier support is moved from the point where the material is metered on the carrier support to a position close to—or located above— the cavity of the mold, i.e. to a position from which the thermoplastic material can be transferred to the cavity of the mold, for example by gravity, for example by tilting the carrier support such that the thermoplastic material falls into the cavity of the mold by gravity, or by depositing it, for example by allowing the carrier support to fall into the cavity of the mold along with the thermoplastic material); and a3) depositing the thermoplastic material inside the cavity of the mold.

It has been found that in this way, instead of making complex movements between the mold and the metering or extrusion machine, the carrier support can be handled by using for example any robot or conventional manipulator, or even by means of manual handling in the cases in which it is more advantageous. A controlled distribution of the material at each point or area of the carrier support can thus be carried out, which is reflected in the subsequent arrangement of the material in the cavity of the mold. As previously described, the machine providing the material is heavy, which makes moving it difficult, slow and tedious, as well as large, therefore its mobility is very limited in a reduced area and surrounded by physical obstacles, such as the obstacle surrounding the cavity of the mold.

Therefore, with the process of the invention better control, greater speed and greater versatility can be obtained compared to conventional solutions with metering directly on the mold; in other words, metering outside the mold with the aid of a carrier support allows a much more controlled, faster and more varied metering and distribution of the material.

In addition, moving the mobile part of an extrusion machine weighing several hundred kilos entails an installation that is large, complex, custom-made, difficult to install and difficult to modify or move, in comparison with the simplicity, versatility, mobility and configurability of the automatism that is necessary for moving the carrier support, which can be a light tray with a few kilos of material, weighing no more than 10 kg in total for example.

Therefore, according to the invention the previously discussed advantages that are inherent to "open mold" processes (and even more so since it is possible to have a more controlled distribution of the material inside the cavity of the mold) are obtained without the different difficulties and drawbacks that can derive from the application of the thermoplastic material directly on the mold or on objects, such as reinforcing members, placed in the mold and eventually forming part of the end product.

The thermoplastic material that is used can be of many types and can completely or partially comprise recycled material and/or different types of filler, reinforcing and/or additive material, as in the previously described processes.

The carrier support can have any suitable shape and the optimal support can be chosen depending on the other features of the process. For example, the carrier support can be an open or closed type support, for example it can be a simple tray, a box or a container of any type, open or closed (for example with a cover). The cover could be used for example to allow overturning the carrier support and also to prevent the thermoplastic material from falling out of the carrier support, for example during the movements of the carrier support, which movements may involve strong accelerations of the carrier support.

The carrier support can be deposited in the cavity of the mold along with the thermoplastic material, or the thermoplastic material can be removed from the carrier support, for example by gravity (tilting the carrier support), when the thermoplastic material is introduced in the cavity of the mold.

The carrier support can have a substantially planar or "two-dimensional" "tray"-type shape.

In step b), the temperature of the thermoplastic material can be above the Vicat softening temperature of the thermoplastic material. This can be important if, for example, the material has to pass through or enter holes or perforations in a reinforcing member housed in the mold, to assure proper integration of such reinforcing member in the obtained product.

In step b), the temperature of the thermoplastic material can be under the melting point of the thermoplastic material. This can be advantageous because it can reduce the energy consumption and reduce the risk that defects due to degradation occur when, for example, there is a lining layer integrated with the product in the mold. Furthermore, the fact that the thermoplastic material initially has a low temperature helps in that the material does not drip through the holes of the carrier support, when such holes exist, before applying the pressure in step b).

However, it is possible to work at higher temperatures, for example in step b), the temperature of the thermoplastic material can be above the melting point of the thermoplastic material in some embodiments of the invention, for example when lining layers are not used.

The thermoplastic material can be distributed on the carrier support such that there is more material present in some areas of its surface than in other areas. The distribution can be done depending on the layout of the product to be obtained so that, for example, there is enough thermoplastic material to create members such as turrets, etc.

The thermoplastic material can be deposited on the carrier support from at least one outlet nozzle of a thermoplastic material extrusion or metering machine. At least one manipulator or robotic arm can be used to move the carrier support with regard to said outlet nozzle during the application of the thermoplastic material, such that the distribution of the thermoplastic material on the carrier support is determined by movements made by said at least one manipulator or robotic arm during the application of the thermoplastic material. The same robotic arm (or arms) can be used to then convey the carrier support with the thermoplastic material to the mold.

Logically several manipulators can be used in the process, i.e. it is not necessary to use the same manipulator to move the carrier support under the dispensing member and to then move it to the mold and to then introduce the thermoplastic material inside the cavity of the mold (by overturning the carrier support for example). Obviously there can be a first manipulator, for example, which moves the carrier support under the dispensing member, a second manipulator for introducing the thermoplastic material in the cavity of the mold, and a third carrier manipulator between the dispensing member and the mold. Evidently it is also possible for two manipulators to perform the three indicated functions, or for a single manipulator to perform these three functions, etc.

Several layers of thermoplastic material and/or several types of thermoplastic material can logically be applied such that, for example, different areas of the carrier support have different thermoplastic materials and/or different amounts of thermoplastic material and/or different ratios between the different thermoplastic materials. For example, the robotic arm can move the carrier support between several nozzles supplying different thermoplastic materials before introducing the thermoplastic material in the cavity of the mold.

Optionally, the thermoplastic material is deposited from a fixed dispensing member, and the carrier support moves, by means of a manipulator (a robot for example), with regard to said fixed dispensing member, such that the thermoplastic material is distributed in a substantially predetermined manner on the carrier support. A suitable distribution of the material on the carrier support can thus be obtained without needing to move the dispensing member, which can be useful, for example, for simplifying the general structure of the system used.

Optionally and alternatively, in step a1) the thermoplastic material is deposited from a movable dispensing member, and the carrier support moves, by means of a manipulator, in synchronization with the dispensing member, such that the thermoplastic material is distributed in a substantially predetermined manner on the carrier support. A quicker distribution of the thermosetting material, for example, can thus be obtained.

Optionally, the carrier support is heated during steps a1) and/or a2), such that the thermosetting material has a temperature exceeding a predetermined threshold when it is deposited in the cavity of the mold. Excessive cooling of the material during steps a1) and/or a2) that may negatively affect the result of the molding process can thus be prevented. In other words, during or between step a1) and a2), the carrier support and/or the thermoplastic material can be heated or preheated. A suitable degree of fluidity or softening of the thermoplastic material can thus be assured, improving its distribution in the cavity of the mold during step b). This can be important, for example, if the time between the depositing of the thermoplastic material on the carrier support and the application of pressure in step b) is long. The need for this type of preheating also depends on other factors such as the initial temperature of the thermoplastic material when it is applied on the carrier support, the metering time and the type of thermoplastic material that is used. This heating prior to introducing the thermoplastic material in the cavity of the mold can be carried out in many ways, for example by means of infrared, hot air, etc.

Optionally, the process may additionally comprise the step of depositing at least one reinforcing member in the cavity of the mold, such that it is an integral part of the obtained product, said reinforcing member having a laminar or substantially laminar shape. The features of the obtained product can thus be improved in terms of, for example, its strength, rigidity, etc. For example, this reinforcing member can be cut from a strip in synchronization with the rest of the process.

The reinforcing member can have larger dimensions than the cavity of the mold (at least in one or two dimensions), die-cutting the excess after shaping the part. In addition, the reinforcing member can have smaller dimensions than the cavity of the mold and be completely housed therein. In this case, there could be an area of the product without a reinforcing member.

Optionally, the reinforcing member is deposited in the cavity of the mold along with the thermoplastic material, for example the reinforcing member can be deposited on the carrier support before step a3). For example in step a1), a first part of the thermoplastic material can be deposited on the carrier support, then the reinforcing member can be deposited on said first part of the thermoplastic material, and then a second part of the thermoplastic material can be deposited on the reinforcing member.

Optionally and alternatively, the reinforcing member can be placed in the cavity of the mold before the thermoplastic material is deposited in the cavity of the mold.

Optionally and alternatively, the reinforcing member c an be introduced in the cavity of the mold after step a3) but before step b).

Optionally, the reinforcing member is or forms part of the carrier support. This embodiment can be particularly advantageous because it allows carrying out the process without having to use an additional carrier support (which is not part of the product), simplifying the process and reducing the material costs. The amount of thermoplastic material that is deposited on the carrier support can be such that in combination with the way the molding process (step b)) is carried out, one or two larger surfaces of the reinforcing member are covered by the thermoplastic material once step b) is carried out. The reinforcing member is thus embedded, to a greater or lesser extent, in the thermoplastic material.

When the reinforcing member is part of the carrier support and/or when the thermoplastic material is deposited on the reinforcing member before it is introduced in the mold, it can be particularly important for the reinforcing member to be placed in the cavity of the mold such that the thermoplastic material does not move with regard to the reinforcing member. In such case, it can be appropriate for the reinforcing member to be introduced in the mold in correspondence with the position of the cavity of the mold and be deposited without breaking or moving. For example, the reinforcing member can be vertically lowered until making contact at its lowest point with the cavity of the mold before it is released.

Optionally, the reinforcing member, along with the thermoplastic material, is overturned approximately 180 degrees about an approximately horizontal axis between step a1) and step a3). For example, in step a1) the thermoplastic material can be deposited on a larger upper surface of the carrier support/reinforcing member. After step a1), the reinforcing member can be turned or overturned (for example approximately 180 degrees according to a substantially horizontal axis) such that said first upper larger surface becomes a lower larger surface before the reinforcing member is introduced in the cavity of the mold. In other words, the reinforcing member is turned over such that the side with the thermoplastic material is facing downwards.

Therefore by turning the reinforcing member 180 degrees or the like, the surface on which the thermoplastic material is deposited faces downwards and comes into contact with an inner surface of the cavity of the mold or with, for example, a sheet or lining material deposited on said inner surface. This can be appropriate when the "visible face" of the product is formed against said inner surface, for example so that said visible face does not reflect the (for example mesh or screen) "structure" of the reinforcing member. This can be particularly relevant when the product has a non-lined visible face (in which the thermoplastic material is visible on said visible face), but also in products with a lined visible face.

Optionally, the reinforcing member, along with the thermoplastic material, can be turned between step a1) and step a3) such that it has a position perpendicular to a closing direction of the mold. This can be useful, for example, when the thermoplastic material is deposited on the reinforcing member in a horizontal state but the mold is a vertical mold closing in the horizontal direction.

The reinforcing member can have a structure in the form of mesh (in this document the expression "in the form of mesh" means that it is a reinforcing member in the form of mesh or screen with a plurality of holes traversing the member from one larger surface to another larger surface of the member; it is a member that can be laminar and more or less planar, and its thickness can be substantially less than its length and its width; the reinforcing member can be made from any suitable material, for example it can be a metal screen or a screen made of a plastic material, for example a thermoplastic, and/or it can be made of plant fibers, but it can also be made of another material, all in accordance with the desired features of the end product).

Optionally, the reinforcing member comprises a plurality of through holes. The reticular structure, mesh structure and/or structure with through holes makes it possible for the thermoplastic material to at least partially penetrate the holes and even be distributed on the opposite face of the reinforcing member in the molding process, improving the attachment between the thermoplastic material and the reinforcing member and assuring a good degree of coupling between the thermoplastic material and the reinforcing member. It has been verified that in this manner, and with a reinforcing member or mesh with suitably l sized and distributed holes (for example depending on the features of the process, including temperatures, pressures and cycle times, and the features of the thermoplastic material that is used), the viscosity and the surface tension of the thermoplastic material, in its melted or at least softened state, allows the material, in step a1), to be substantially deposited on the surface without "dripping" through the holes and without the reinforcing member becoming detached, during the time it takes to move the reinforcing member to the point where it is introduced in the cavity of the mold.

Optionally and alternatively, the reinforcing member comprises on at least one surface a plurality of non-through holes. These perforations or non-through holes may allow the thermoplastic material to at least partially enter said holes, such that a stronger attachment or coupling between the reinforcing member and the thermoplastic material is obtained than what would have been obtained with a reinforcing member with a substantially smooth surface. Suitable penetration of the plastic material in said perforations or through holes or non-through holes occurs due to the pressure exerted on the thermoplastic material in the mold.

Optionally, the reinforcing member is pre-heated before coming into contact with the thermoplastic material.

The cavity of the mold can be configured such that in step b), the thermoplastic material forms at least one functional member, for example selected from the group comprising: fixing turrets, cable fixing clamps, reinforcing members and impact absorption structures.

In some embodiments of the invention, in step a1) the amount of thermoplastic material that is deposited on the carrier support can be controlled. The metering of the thermoplastic material in controlled amounts is advantageous since for example: it assures that the mold is correctly filed, covering the entire surface of the part with the material; it allows obtaining complex shapes in certain areas, creating functional members, i.e. areas of the part having their own functions and which in the state of the art are commonly independent parts which are assembled on the previously obtained plastic part, and/or ribs or reinforcements; and it reduces the risk of dragging a reinforcing or lining inside the mold.

For example, in step a1), the amount of thermoplastic material that is deposited on the carrier support can be controlled such that in at least one area of the carrier support more thermoplastic material is deposited per surface unit than in another area of the carrier support. A distribution of the thermoplastic material on the carrier support that corresponds with the features of the product to be obtained is thus achieved, i.e. it is possible to deposit more material in the areas corresponding to the thicker areas in the product to be obtained, or in the areas corresponding to functional members requiring more material, etc. The material thus introduced in the mold may already have a distribution that is fairly consistent with the distribution the material will have in the product to be obtained, such that when the mold is closed, the "final shape" is given to this material, but it will not be necessary to move large amounts of the thermoplastic material from one area of the mold to another using pressure, in contrast with what occurs in an injection process of the type described above in relation to the state of the art.

The cavity of the mold can be provided with positioning means for positioning additional insert parts. In other words, the cavity can be configured such that additional members, which can be integrated into the product in step b) and thus be part of the end product, can be placed therein in certain positions.

Optionally, at least one lining layer is introduced in the mold before step b), such that it is an integral part of the obtained product and such that it covers at least one part of a face of the obtained product. In other words, it is possible to introduce at least one lining layer in the cavity of the mold, for example before the thermoplastic material (with or without a reinforcing member) is introduced in the cavity of the mold, such that, for example, the lining layer is located between a larger surface of the reinforcing member and a contact surface of the mold. The direct attachment between the thermoplastic material, the reinforcing member, when such member is used, and the lining is thus facilitated.

The lining layer can include a reinforcing layer that is embedded inside the obtained product. This reinforcing layer could be made from the same material as the lining layer and could replace the reinforcing member discussed above or it could be a complement to said reinforcing member. For example, it is possible "to weave" lining layers incorporating threads or strands projecting from the surface of said layer, forming a three-dimensional structure that can be filled with the plastic material, such that this three-dimensional structure is embedded within the plastic material.

Optionally, the process further comprises the steps of, after step c), cutting the excess material away from the obtained product.

The process can be a process for obtaining a member for an automobile, for example a member selected from the group comprising: a door panel, a rear tray and a pillar trim.

Another aspect of the invention relates to an object or product obtained or that can be obtained with the process described above.

DESCRIPTION OF THE DRAWINGS

To complement the description and for the purpose of aiding to better understand the features of the invention according to preferred practical embodiments thereof, a set of drawings is attached as an integral part of the description in which the following has been shown with an illustrative and non-limiting character.

PREFERRED EMBODIMENT OF THE INVENTION

Figure 1A:
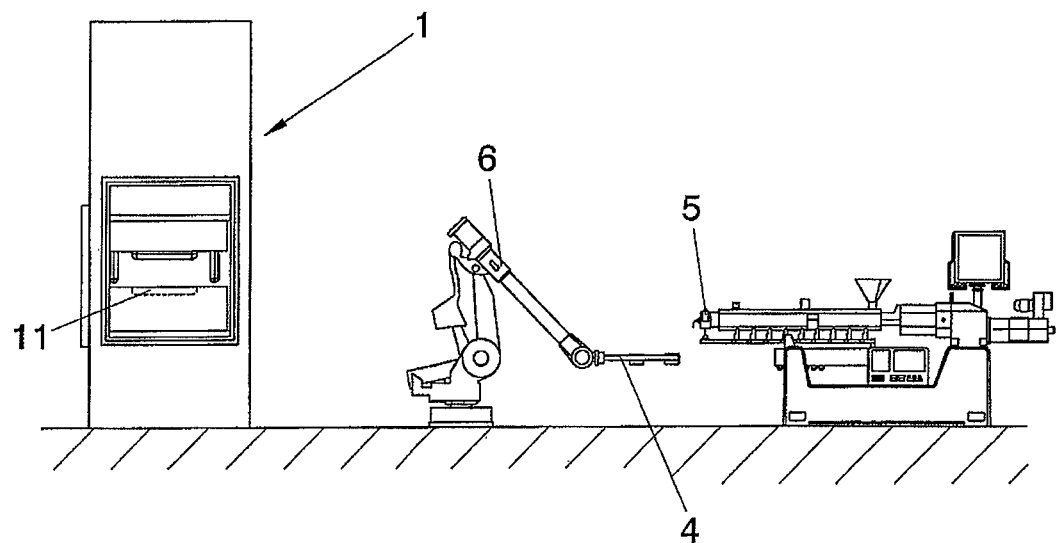
FIGS. 1A-1E are two schematic elevational views of a facility for carrying out a process according to a possible embodiment of the invention, in respective phases of the process.
Figure 1B:
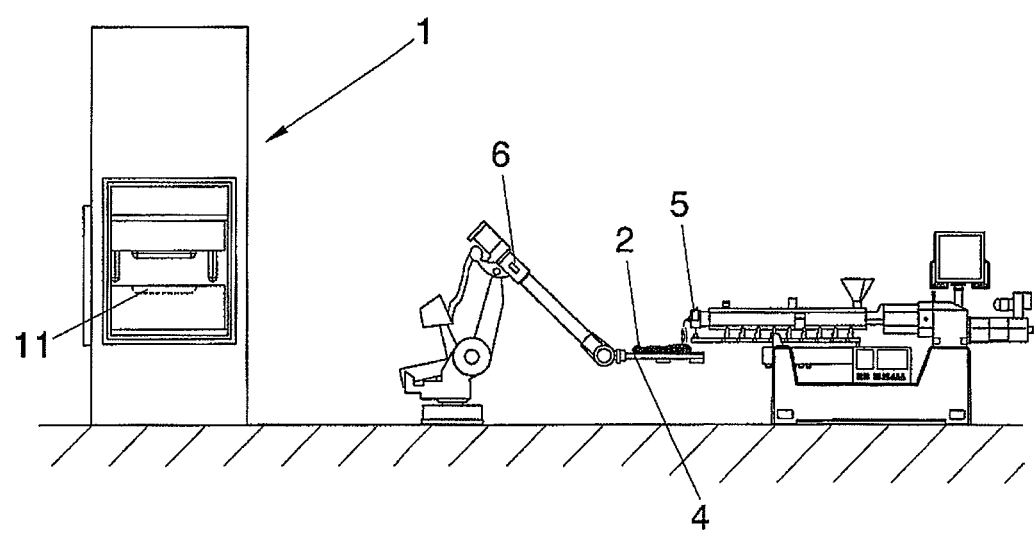
Figure 2A:
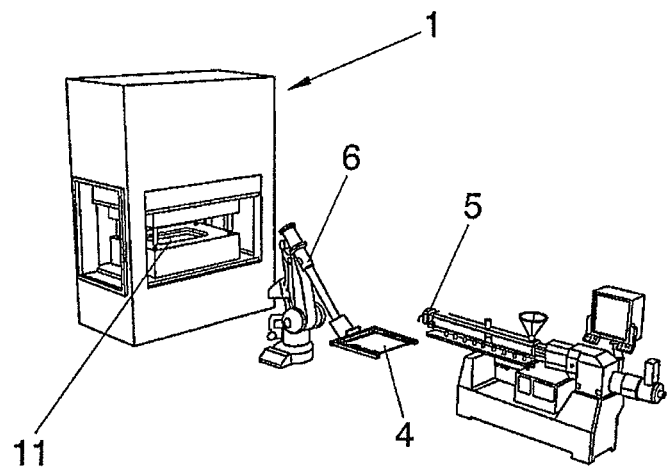
FIGS. 2A-2E are two schematic plan views of the facility in said two phases of the process.
Figure 2B:
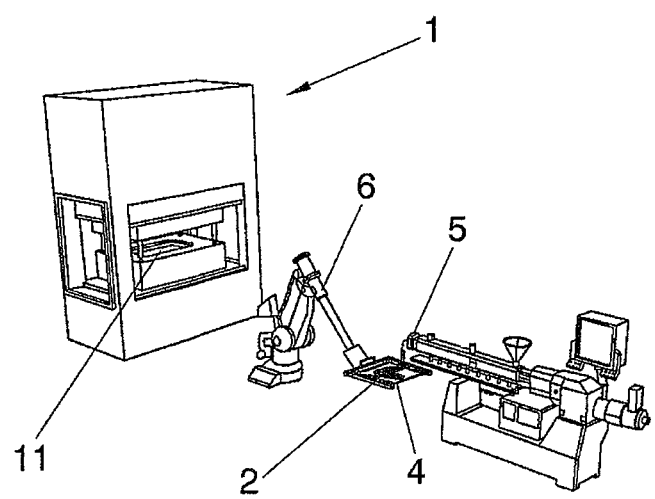
Figure 2C:
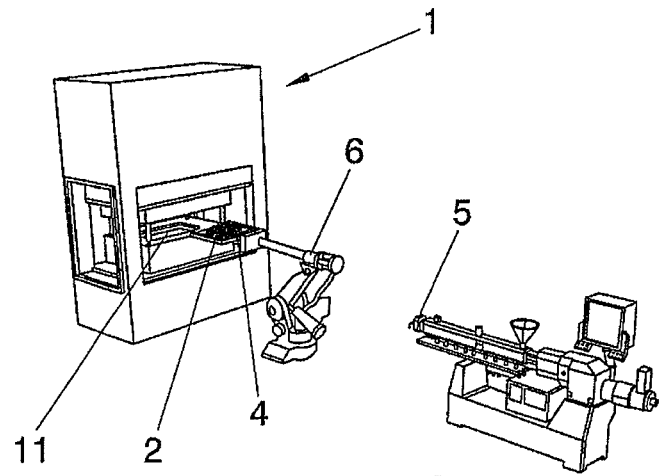
Figure 2D:
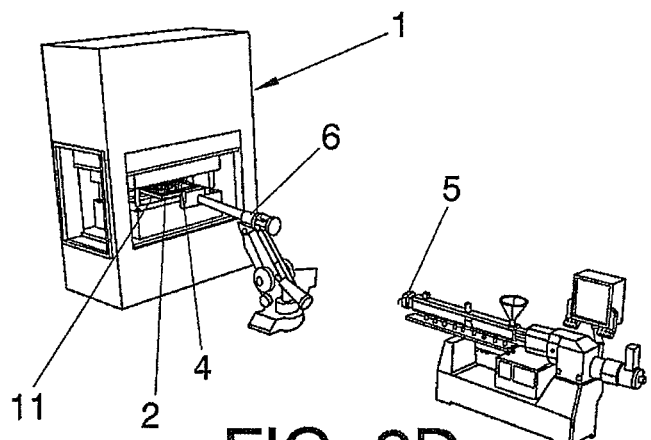

FIGS. 1A and 2A show how a manipulator 6 holds a carrier support 4 in the form of a tray (and which can be formed by a reinforcing member 7), which moves towards a metering machine. In FIGS. 1B and 2B, the carrier support receives, from a dispensing member 5 of the thermoplastics metering or extrusion machine, a certain amount of thermoplastic material 2 comprising one or more thermoplastic resins. The distribution of the thermoplastic material on the carrier support 4 is determined from the relative movement between the carrier support 4 and the dispensing member 5; for example, the robot or manipulator 6 can move the carrier support 4 with regard to a fixed dispensing member 5, or the manipulator 6 can move the carrier support 4 in synchronization with the movement of a mobile dispensing member 5, etc.

Figure 1C:
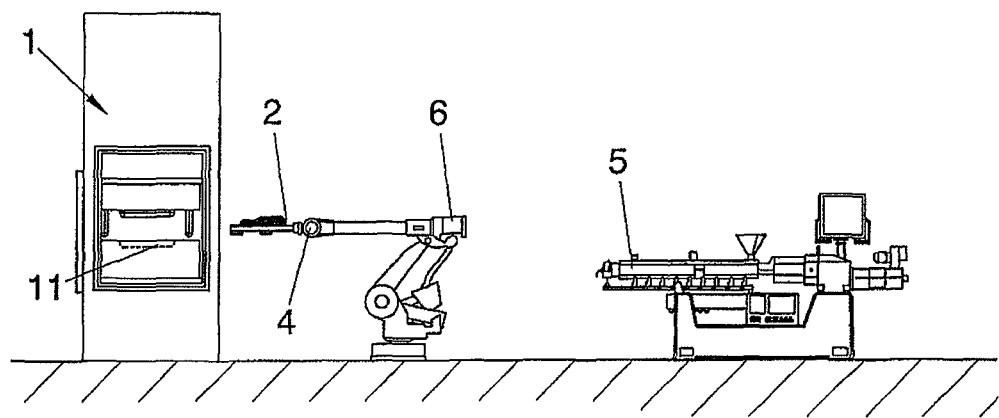
Figure 1D:
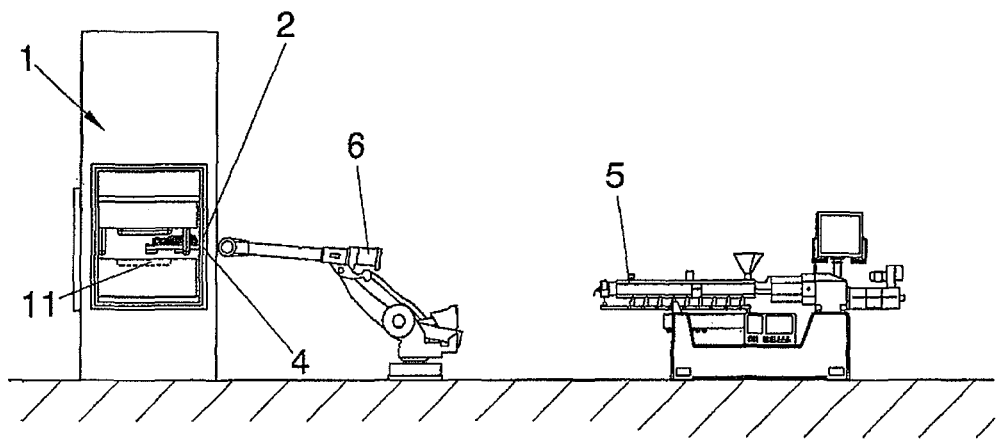
Figure 1E:
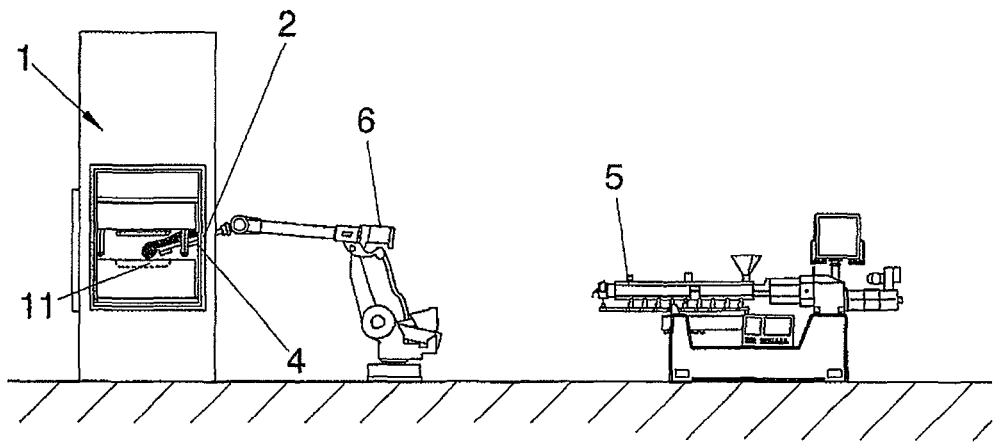
Figure 2E:
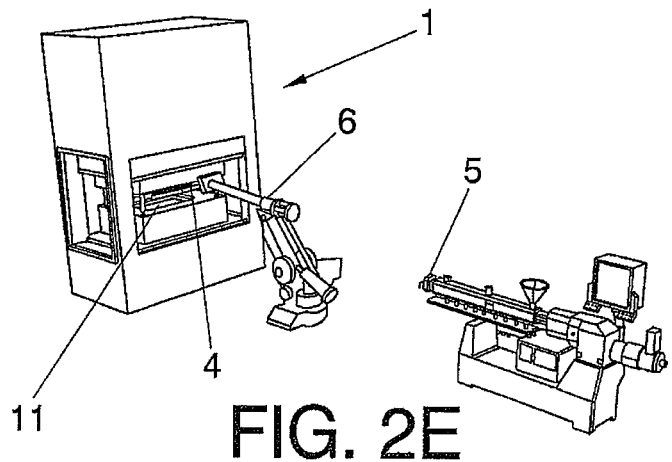
Figure 9A:
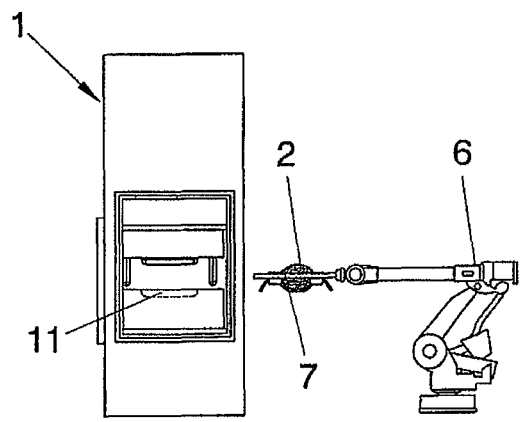
FIGS. 9A-9C schematically show phases of the process according to another possible embodiment of the invention.
Figure 9B:
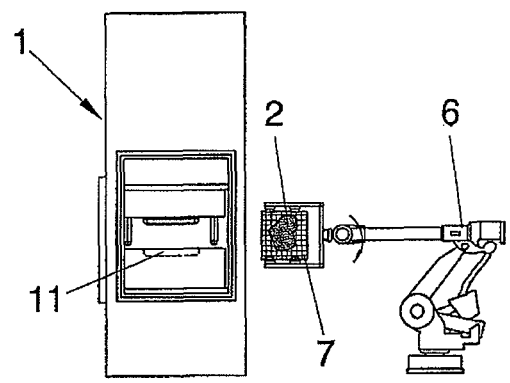
Figure 9C:
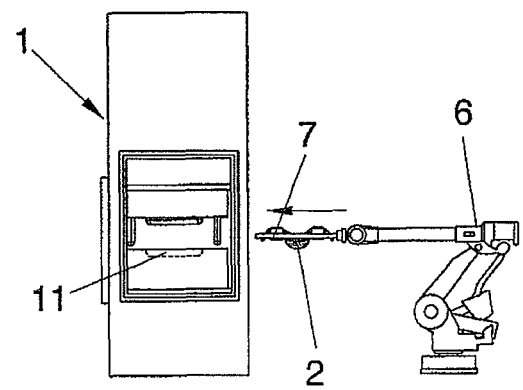

Once the thermoplastic material 2 has been deposited on the carrier support 4, the manipulator 6 moves said carrier support towards the mold 1 (FIGS. 1C-1D/2C-2D) and places (FIGS. 1E and 2E) the thermoplastic material 2 and optionally the carrier support 4, in the cavity 11 of the mold 1. Optionally, the manipulator can overturn (for example by turning 180 degrees) the carrier support so that the thermoplastic material is facing "downwards" before depositing the carrier support 4 in the cavity 11, or it can tilt the carrier support 4 so that the thermoplastic material 2 falls inside the cavity 11 by gravity. For example, the carrier support can be a tray with an upper surface having a low coefficient of friction (for example it can have an upper Teflon surface or the like), therefore the thermoplastic material can easily slide with regard to said surface. In addition, turning it 180 degrees can be particularly interesting if the carrier support is a reinforcing member or the like that has to be part of the product. FIGS. 9A-9C schematically show this "overturning" process in the event that the carrier support 4 is a reinforcing member 7.

As can be understood from FIGS. 1A-1E and 2A-2E, any need for moving the dispensing member 5 with regard to the cavity 11 is thus avoided, and good distribution of the thermoplastic material on the carrier support 4 is obtained, as explained above.

Figure 3A:
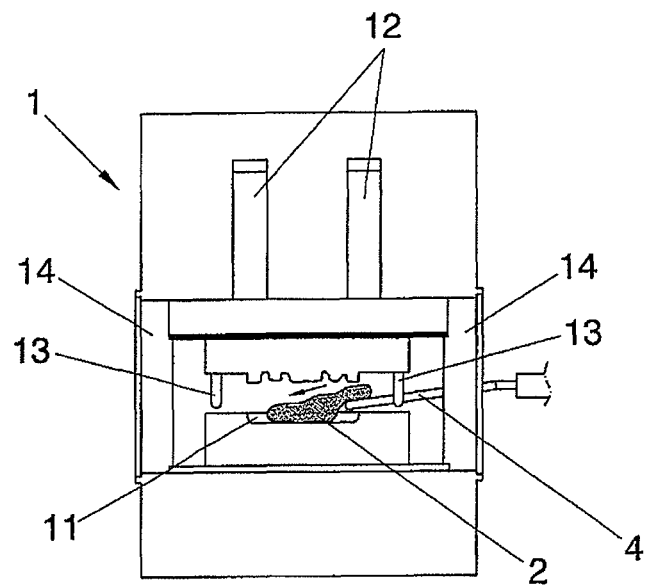
FIGS. 3A-3D schematically show phases or steps of the process according to a possible embodiment of the invention.
Figure 3B:
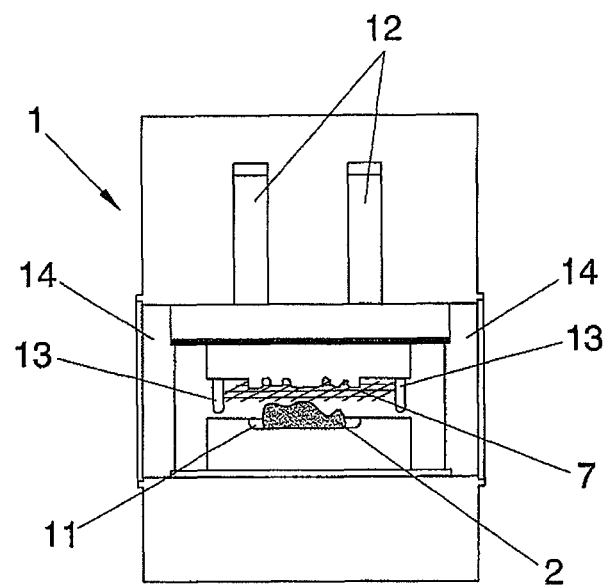
Figure 3C:
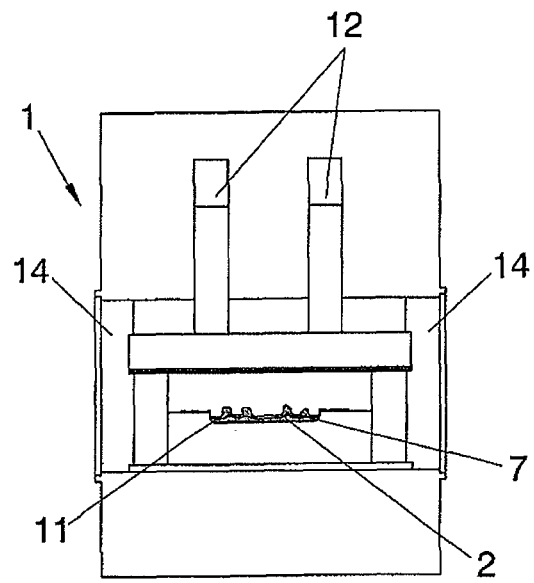
Figure 3D:
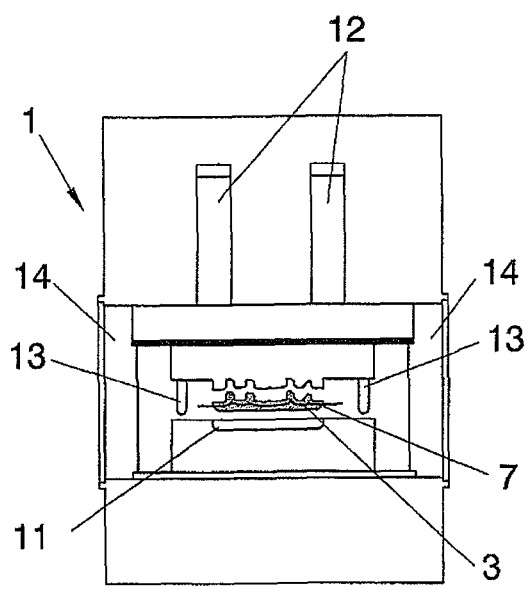
Figure 4A:
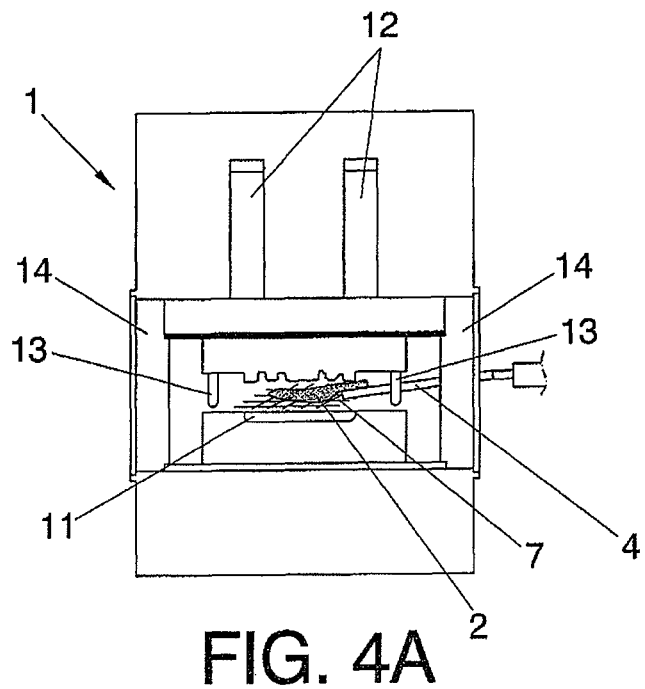
FIGS. 4A-4D schematically show phases of the process according to another possible embodiment of the invention.
Figure 4B:
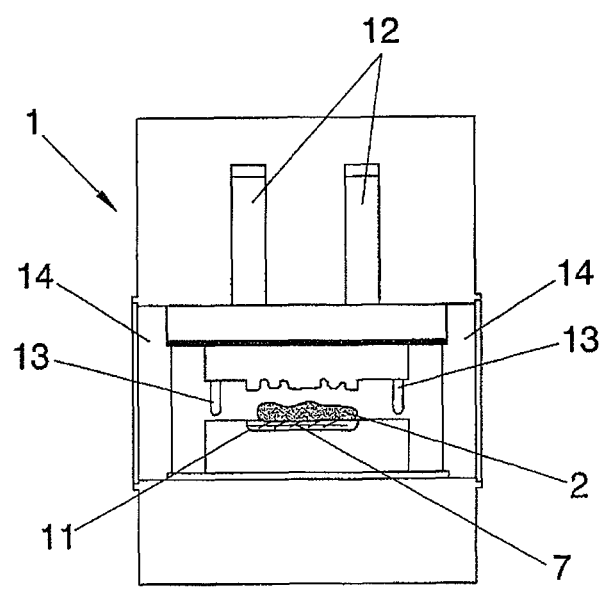
Figure 4C:
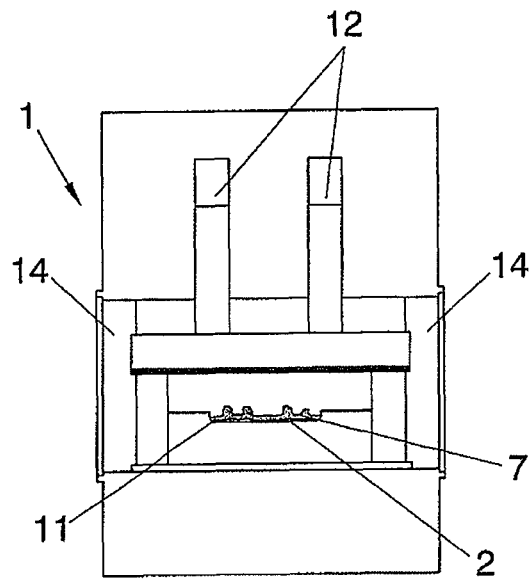
Figure 4D:
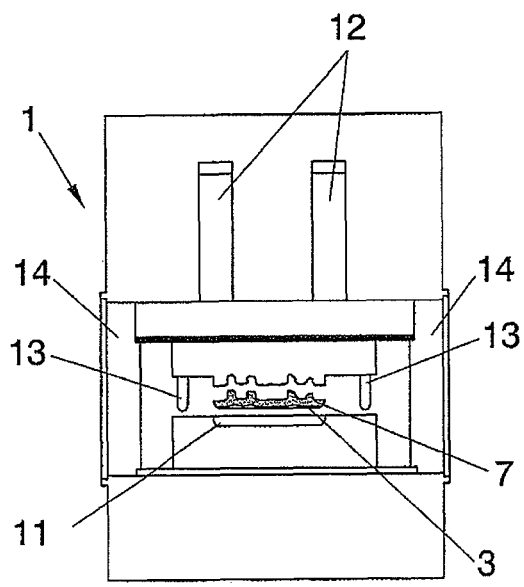

FIGS. 3A-3D schematically show a process in which the thermoplastic material 2 is first deposited in the cavity 11 of the mold 1 and then a reinforcing member 7 in the form of mesh is added on said thermoplastic material 2, (FIG. 3A). Then the mold is closed (FIG. 3B) and the material is compressed and distributed (FIG. 3C), such that the reinforcing member 7 is embedded in the thermoplastic material 2, passing through the holes of the mesh. FIG. 3D shows how the mold opens to remove the obtained product 3, with the reinforcing member 7 embedded in the thermoplastic material 2.

As can be seen, in the example shown in FIGS. 3A-3D the reinforcing member 7 has dimensions that are larger than those of the cavity 11 of the mold, whereby it projects with regard to the obtained product 3. Therefore, it may be necessary to trim the reinforcing member, which can be done with conventional trimming means. This trimming can be done after obtaining the product 3 in the step shown in FIG. 3D, or even sooner, for example during step 3C.

FIGS. 3A-3D also show the cylinders 12 the movement of which cause the mold to open and close, the guide cylinders 13 (which in the state of the art may make it difficult to introduce the thermoplastic material in the mold) and the columns 14 holding the upper part of the machinery of the mold over the lower part of said machinery. These members can also be seen in several figures that will be discussed below.

FIGS. 4A-4D show a similar process, but in which the reinforcing member 7 is placed in the cavity 11 of the mold 1 before the thermoplastic material 2 is deposited in said cavity.

Figure 5A:
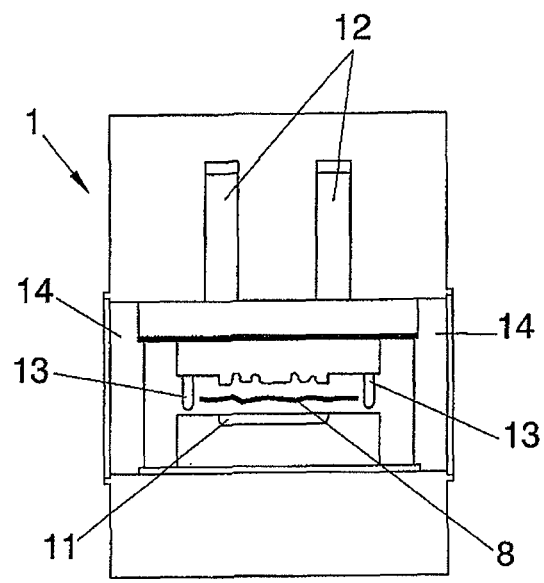
FIGS. 5A-5E schematically show phases of the process according to another possible embodiment of the invention.
Figure 5B:
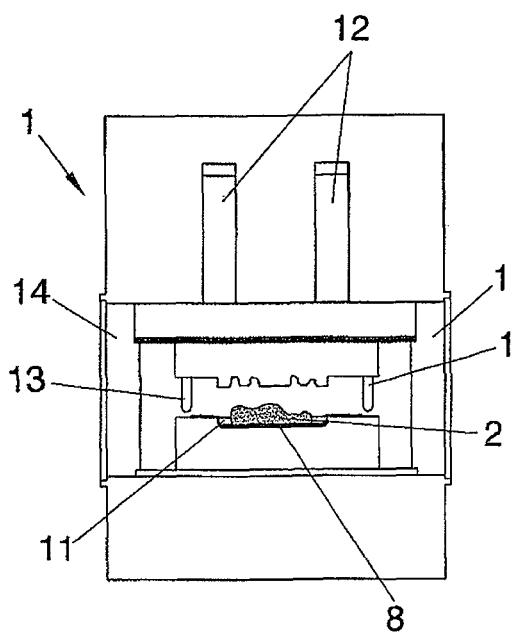
Figure 5C:
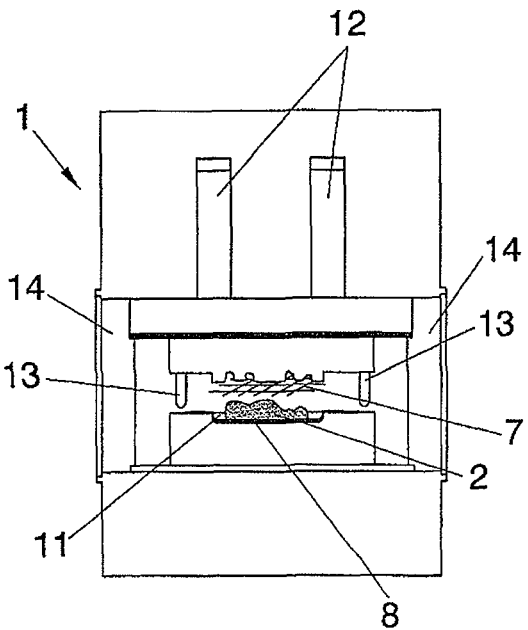
Figure 5D:
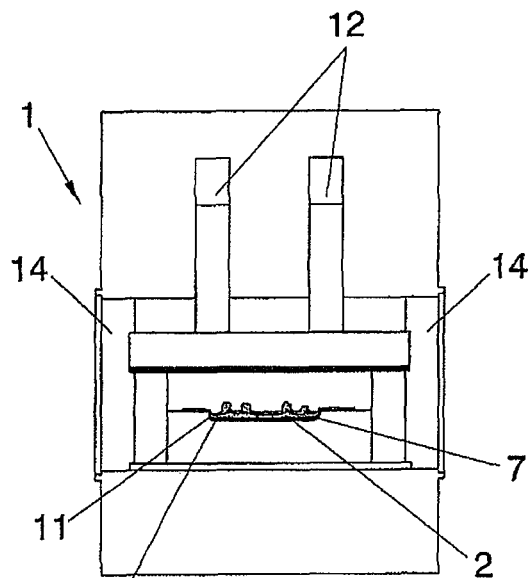
Figure 5E:
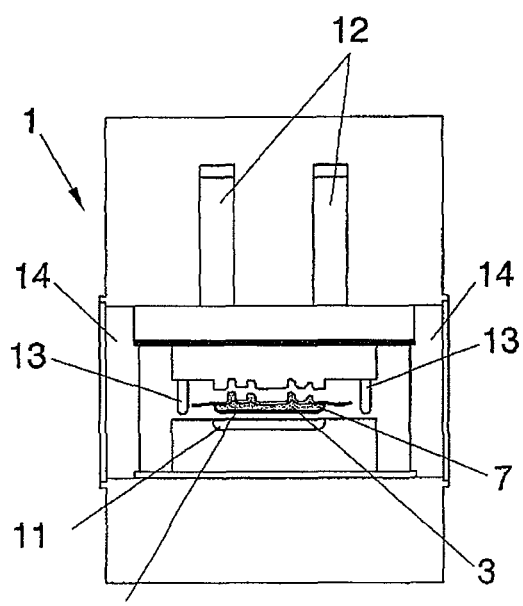
Figure 6A:
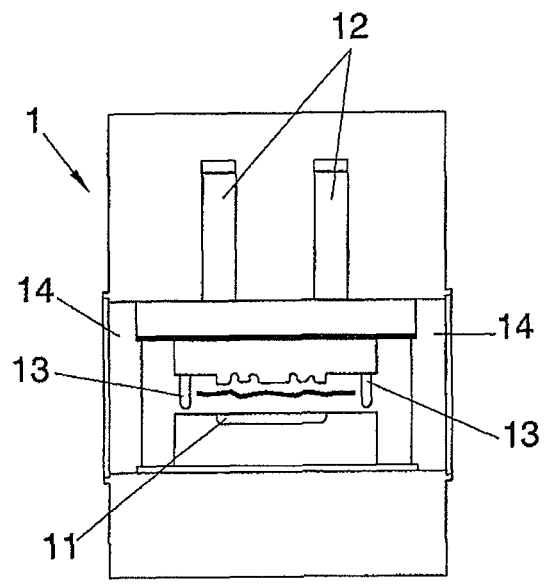
FIGS. 6A-6E schematically show phases of the process according to another possible embodiment of the invention.
Figure 6B:
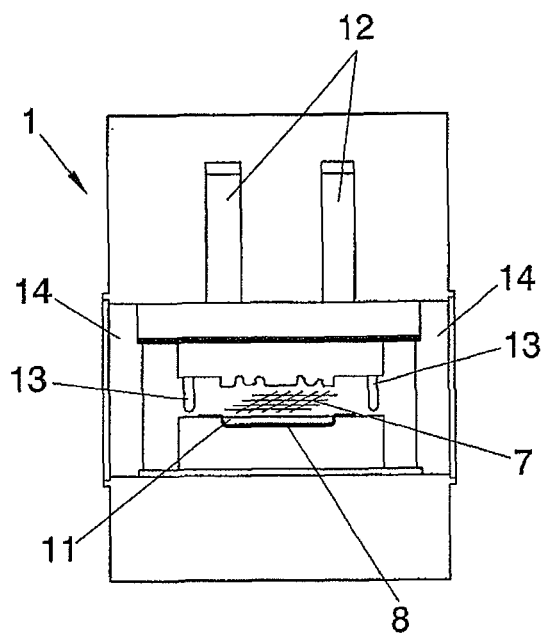
Figure 6C:
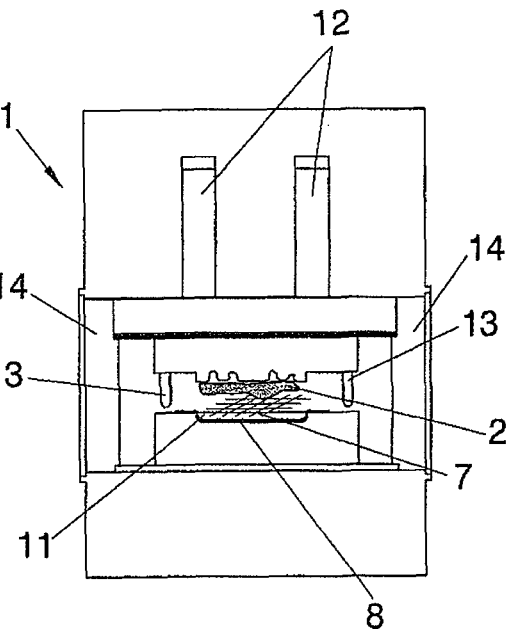
Figure 6D:
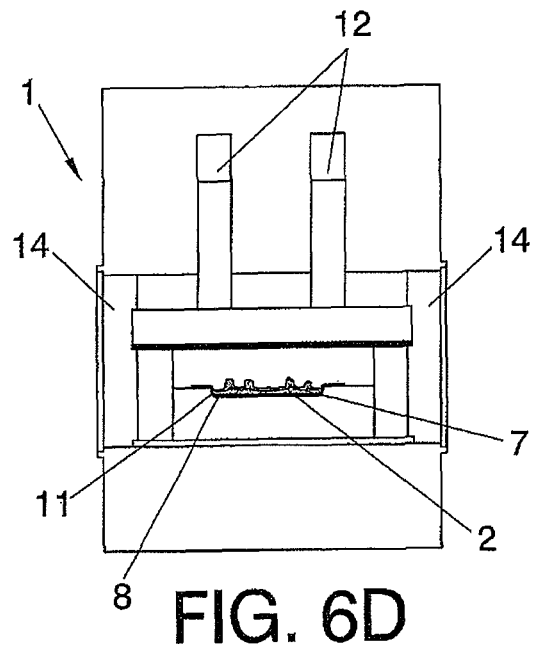
Figure 6E:
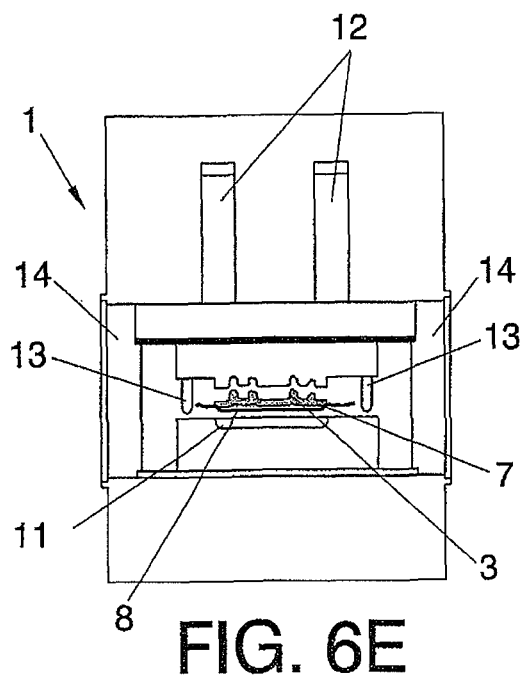

FIGS. 5A-5E shows a process similar to that of FIGS. 3A-3D, but with a first step that is shown in FIG. 5A and comprising the placement of a sheet 8 which will form a lining layer 8 of the product 3 extracted at the end of the process (FIG. 5E). This lining layer 8 is placed on a lower surface of the mold, and the thermoplastic material 2 is placed on top of it (FIG. 5B). In order for the lining layer to not become wrinkled during the process, gripping and centering means can be used which for example peripherally hold the lining so as to maintain its tension. This can be done inside the mold, before the thermoplastic material 2 is deposited. The gripping means can be, for example, means provided in the actual mold (by means of clamps or any other device) or they can comprise an outer member that is introduced in the mold with the lining (for example a frame with a series of needles traversing and holding the lining along its periphery). These means must keep the lining stretched or tensed while the thermoplastic material 2 is being poured.

Then the reinforcing member 7 is placed on the thermoplastic material 2 (FIG. 5C), the cavity of the mold is closed (FIG. 5D), and once it is opened again, the obtained product 3 is removed (FIG. 5E).

If the lining projects from the thermoplastic material (which is the case in the example shown in FIGS. 5A-5E), it can be trimmed similar to that discussed above in relation to the reinforcing member.

FIGS. 6A-6E show a process similar to the process of FIGS. 5A-5E, but with the difference that the reinforcing member 7 is deposited on the lining layer 8 before the thermoplastic material 2 is deposited in the cavity 11 of the mold 1.

Figure 7A:
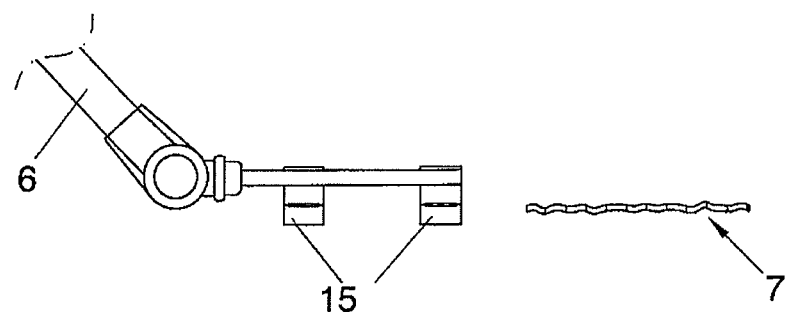
FIGS. 7A-7F schematically show phases of the process according to another possible embodiment of the invention.
Figure 7B:
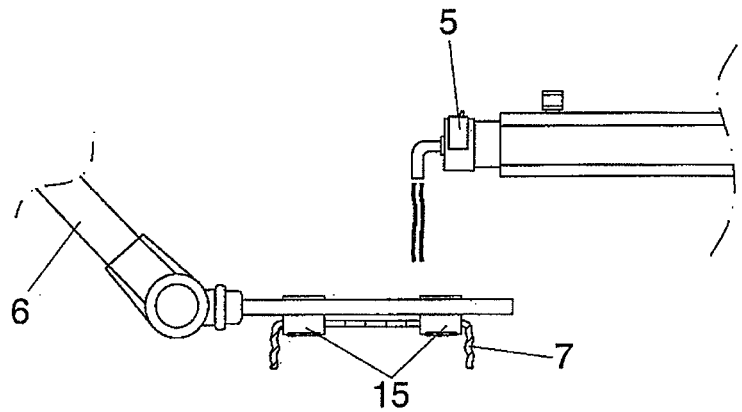
Figure 7C:
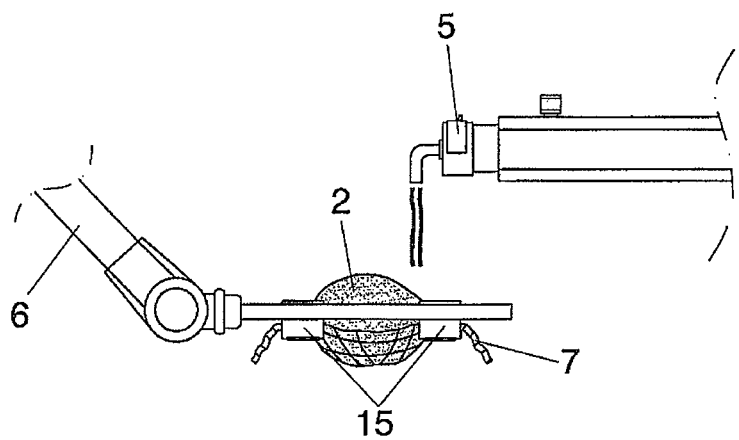
Figure 7D:
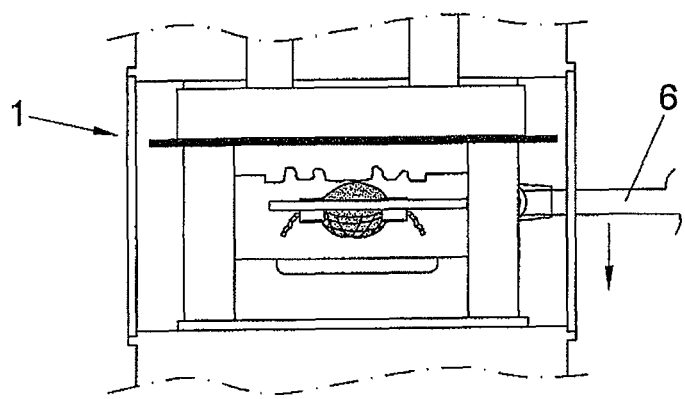
Figure 7E:
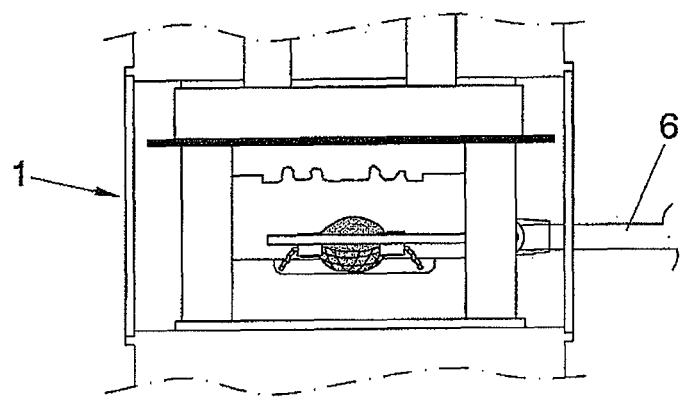
Figure 7F:
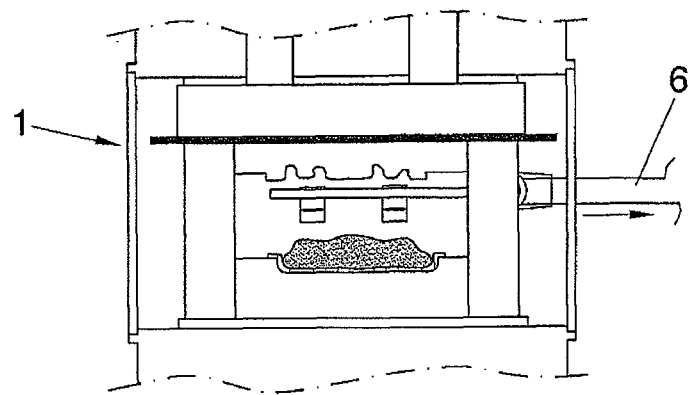
Figure 8A:
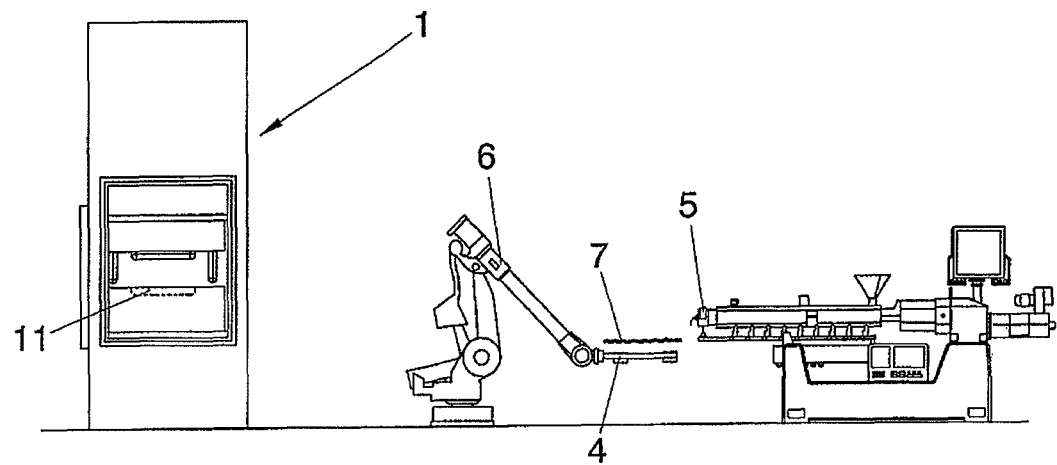
FIGS. 8A-8E schematically show phases of the process according to another possible embodiment of the invention.
Figure 8B:
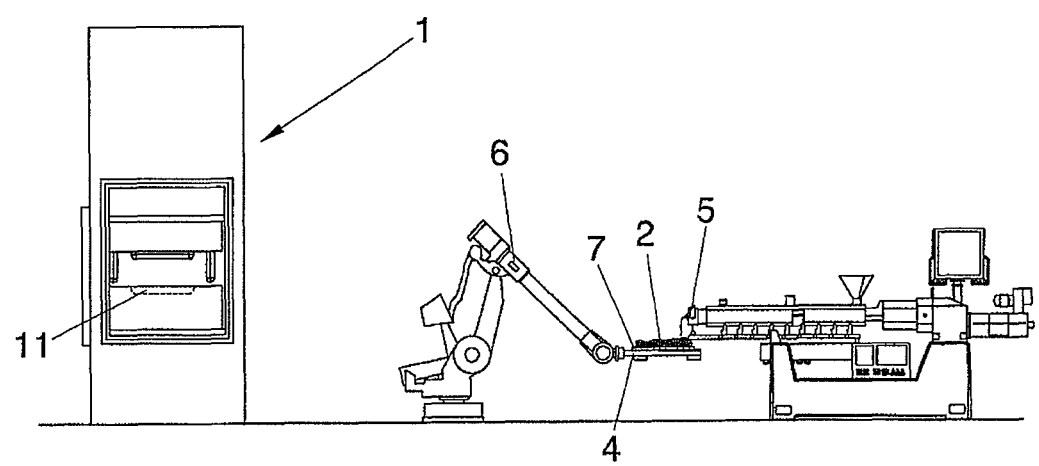
Figure 8C:
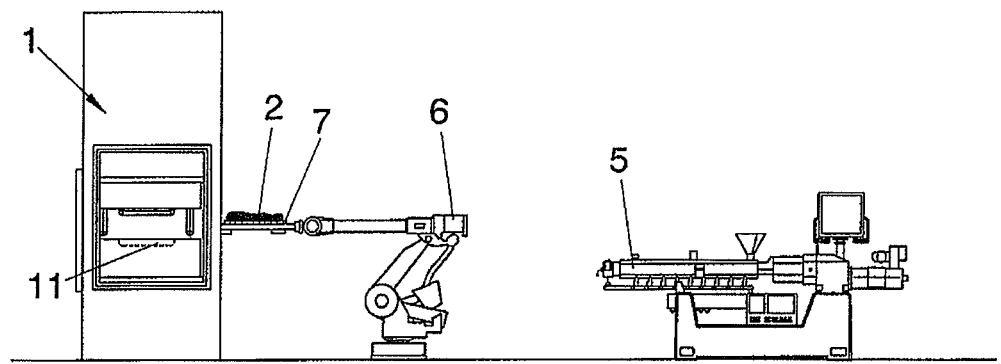
Figure 8D:
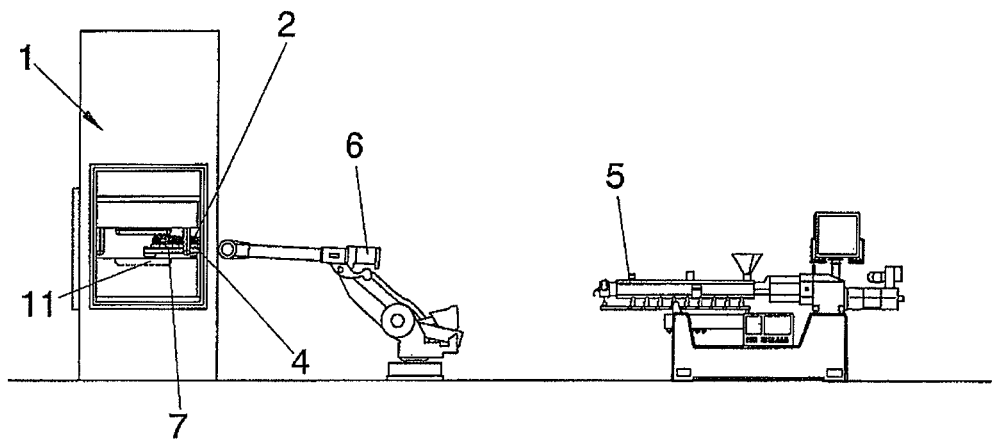
Figure 8E:
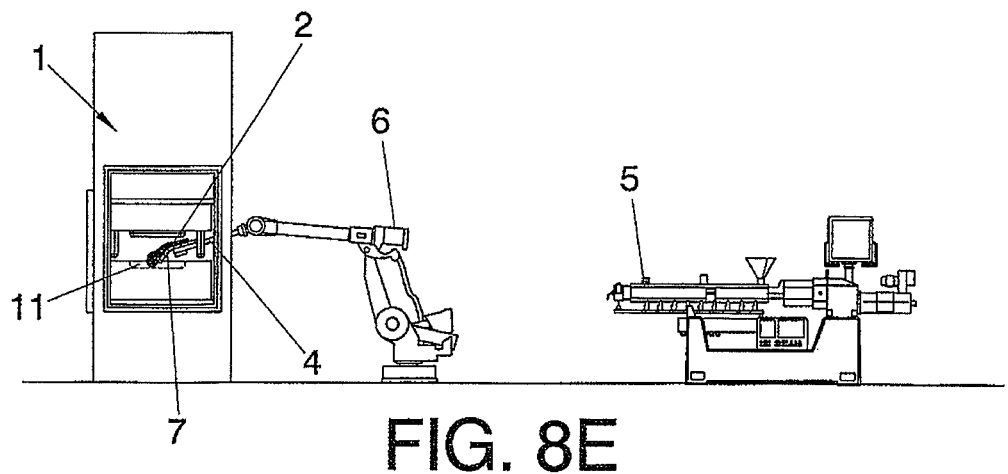

FIGS. 7A-7F show in greater detail part of a process in which the carrier support comprises the reinforcing member 7, which is held by clamps 15 associated to the manipulator 6. FIG. 7A shows how the reinforcing member 7 is positioned close to the manipulator 6, and in FIG. 7B the manipulator 6 holds the reinforcing member 7 and positions it so that it can receive the thermoplastic material from the dispensing member 5 (FIGS. 7B and 7C). Once the suitable amount of thermoplastic material has been correctly metered, the reinforcing member is introduced in the mold 1 (FIG. 7D) and the manipulator lowers it such that it places it in the cavity 11 of the mold (FIG. 7E), where it releases it (FIG. 7F). Drops are thus prevented which could cause the unwanted movement of the thermoplastic material with regard to the reinforcing member 7 and/or with regard to the cavity 11 of the mold.

FIGS. 8A-8E show an alternative embodiment in which the reinforcing member 7 is placed on the carrier support 4 (FIG. 8A) before the thermoplastic material is deposited, such that the thermoplastic material is deposited on the reinforcing member (FIG. 8B), after which the manipulator 6 moves the carrier support 4 with the reinforcing member 7 towards the mold (FIG. 8C), positioning it close to the cavity of the mold (FIG. 8D), after which it pours the thermoplastic material 2, along with the reinforcing member 7, into the cavity of the mold 11.

Figure 10B:
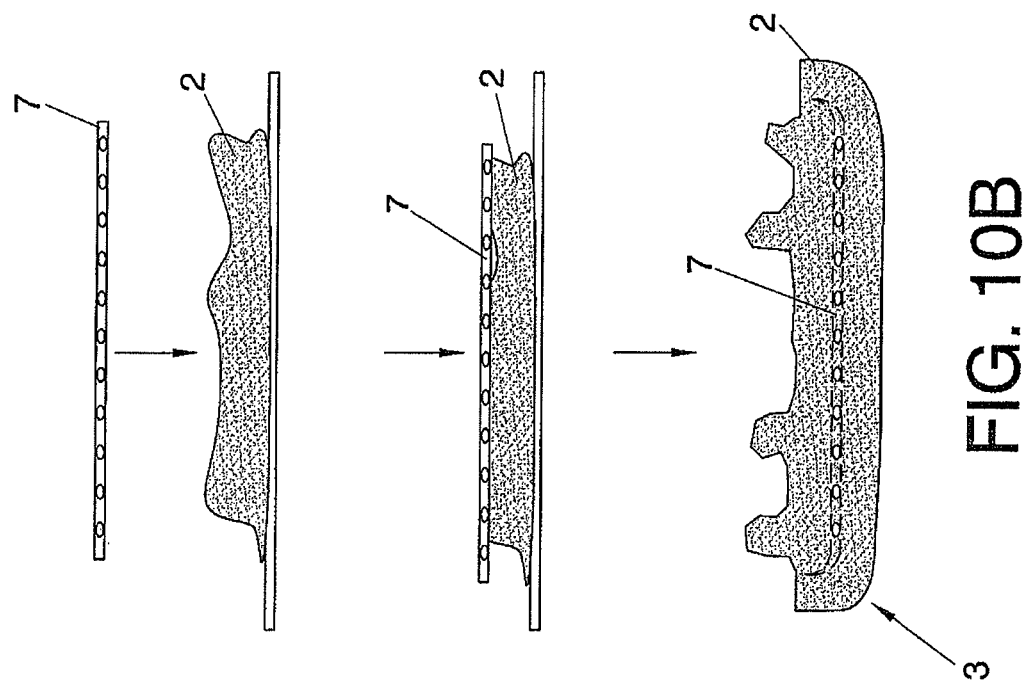
FIGS. 10A, 11A and 12A are schematic perspective views of components used in respective embodiments of the invention, and FIGS. 10B, 11B and 12B schematically show steps of the corresponding processes.
Figure 10A:
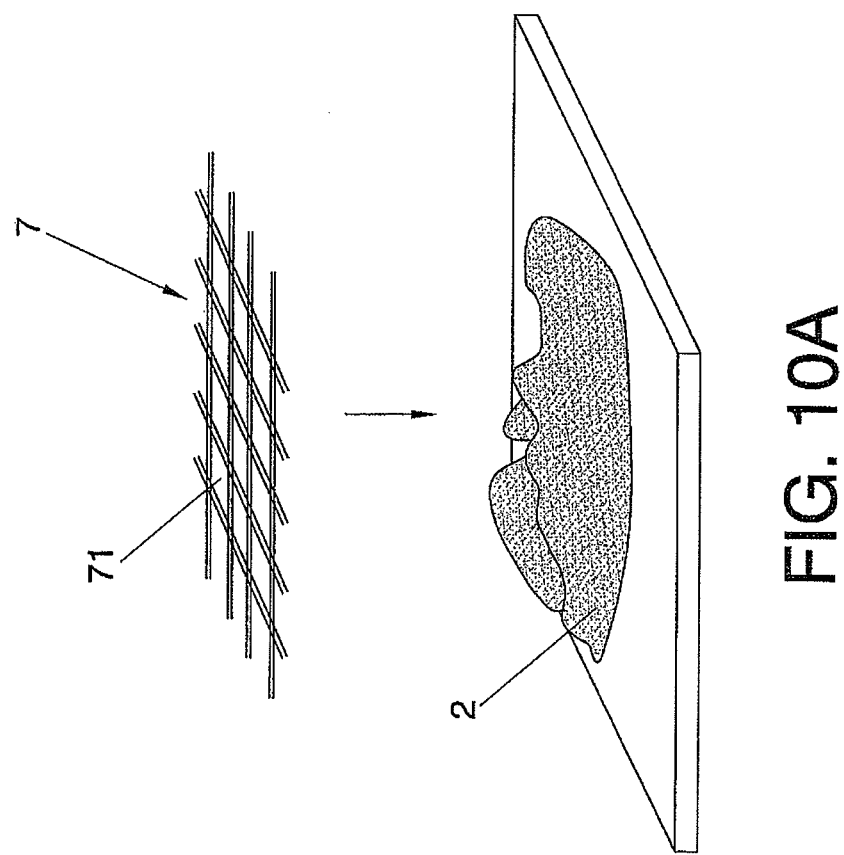
Figure 11B:
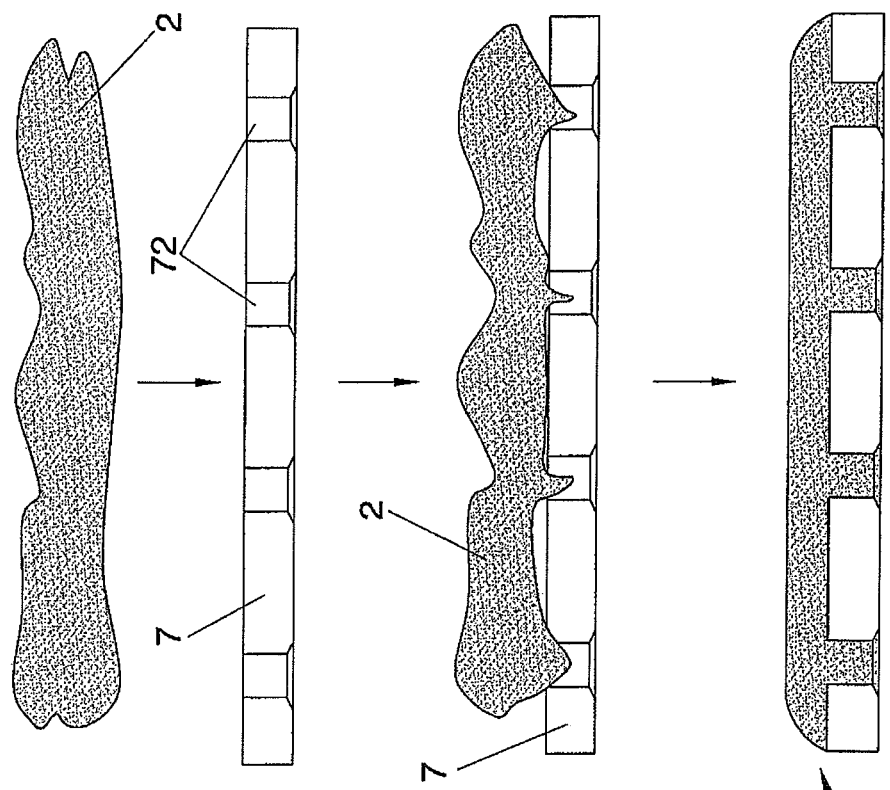
Figure 11A:
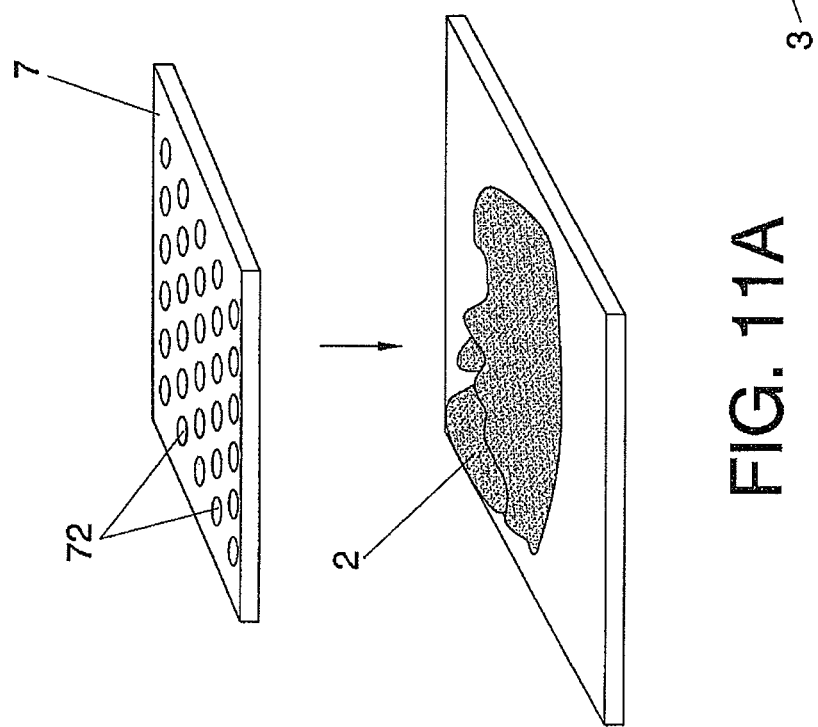
Figure 12B:
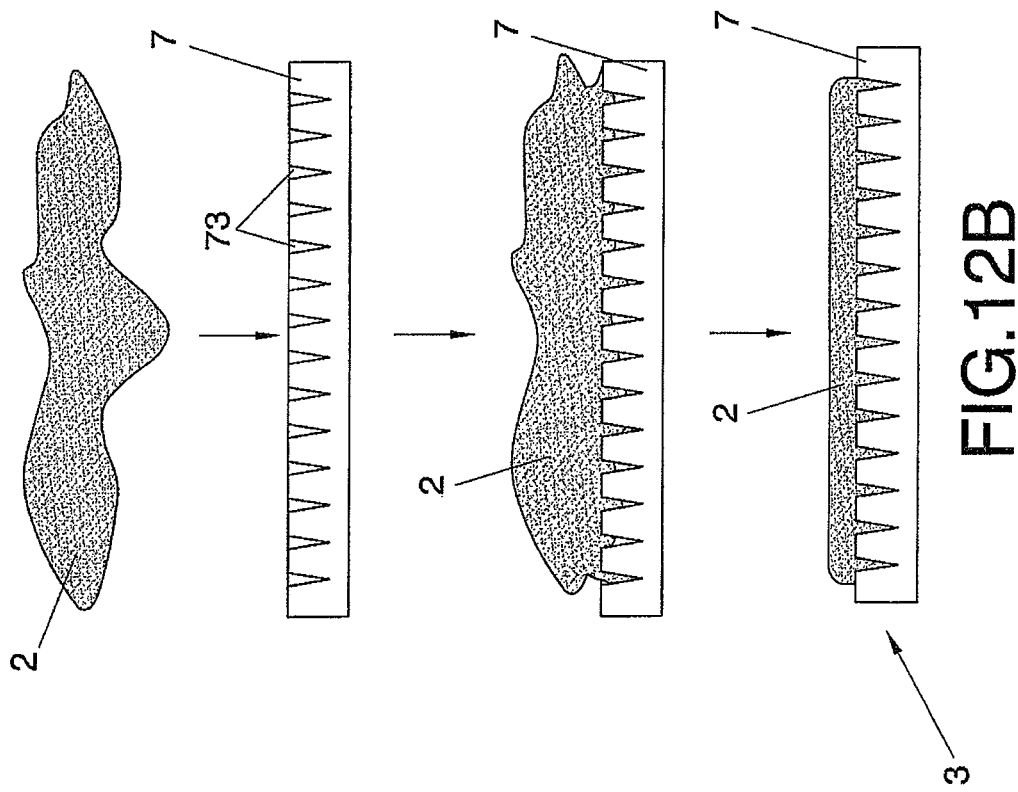
Figure 12A:
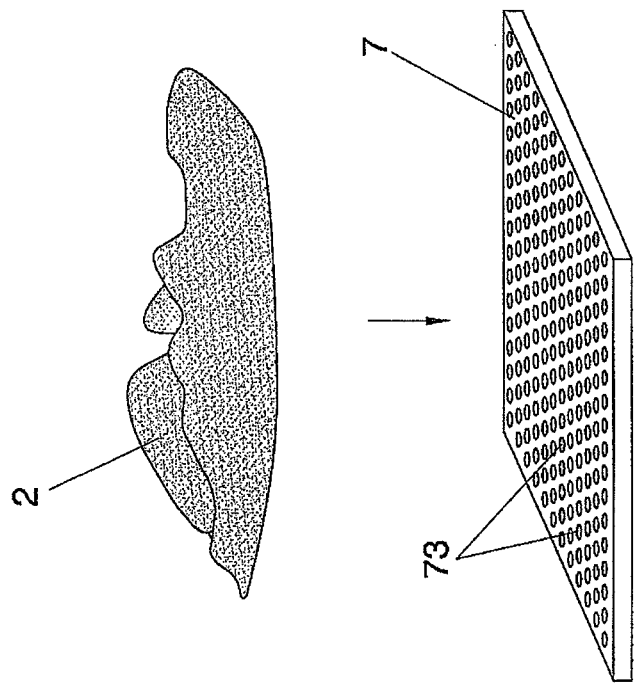

FIGS. 10A, 11A and 12A show three different types of reinforcing members 7 (which can also be or form part of the carrier support 4, as explained above). FIG. 10A shows a reinforcing member 7 in the form of flexible mesh with its through holes 71, FIG. 11A shows a rigid reinforcing member 7 with through holes 72, and FIG. 12A shows a reinforcing member 7 having non-through holes or perforations 73. As can be seen in FIGS. 10B, 11B and 12B, the pressure in the molding process makes the thermoplastic material 2 enter the holes 71, 72 and 73, such that the reinforcing member 7 in the obtained product 3 is embedded in the thermoplastic material (FIGS. 10B, 11B) or the thermoplastic material adheres to at least one surface of the reinforcing member (FIG. 12B), with a suitable degree of coupling due to the fact that the thermoplastic material enters the through holes 71, 72 (FIGS. 10B, 11B) and non-through holes 73 (FIG. 12B), respectively. Therefore, in all the cases shown, the correct coupling between the thermoplastic material and the reinforcing member is achieved by the penetration of the thermoplastic material in the holes of the reinforcing member.

Therefore, and as can be inferred from this description, the invention relates to a versatile process which aids in the manufacture of products from thermoplastic resins.

In this text, the word "comprises" and its variants (such as "comprising", etc.) must not be interpreted in an exclusive manner, i.e. they do not exclude the possibility that other members, steps, etc. could be included in what has been described.

In addition, the invention is not limited to the specific embodiments described above, but also comprises, for example, the variants that can be carried out by a person with average skills in the art (for example in relation to the choice of materials, dimensions, components, layout, etc.) within the scope of the following claims.

The invention claimed is:

1. A process for manufacture of thermoplastic resin parts, comprising the steps of:
    a) introducing a thermoplastic material comprising at least one thermoplastic resin in a cavity of a mold;
    b) closing the mold, compressing and distributing the thermoplastic material inside the cavity of the mold;
    c) opening the mold and removing a product, obtained from said thermoplastic material, from the cavity of the mold; wherein
    step a) comprises:
        a1) depositing the thermoplastic material in a softened state on a carrier support, such that the thermoplastic material is distributed on the carrier support in a pattern corresponding to a layout of the product of step c), wherein said pattern is determined by a relative movement between the carrier support and a dispensing member from which the thermal plastic material is deposited;
        a2) moving the carrier support, with the thermoplastic material, towards the cavity of the mold and introducing said carrier support inside the cavity of the mold;
        a3) depositing the thermoplastic material by gravity inside the cavity of the mold;
    wherein said carrier support is a tray, a box or a container.

2. A process according to claim 1, wherein in step a1), the dispensing member is fixed, and wherein the carrier support is moved, by means of a manipulator, with regard to said fixed dispensing member, such that the thermoplastic material is distributed in said pattern corresponding to the layout of the product.

3. A process according to claim 1, wherein in step a1), the dispensing member is movable, and wherein the carrier support is moved, by means of a manipulator, in synchronization with the dispensing member, such that the thermoplastic material is distributed in said pattern corresponding to the layout of the product.

4. A process according to claim 1, wherein the carrier support is heated during steps a1) and/or a2), such that said thermoplastic material is in said softened state when it is deposited in the cavity of the mold.

5. A process according to claim 1, additionally comprising the step of depositing at least one reinforcing member in the cavity of the mold, such that it is an integral part of the obtained product, said reinforcing member having a laminar shape.

6. A process according to claim 5, wherein said reinforcing member is deposited in the cavity of the mold along with the thermoplastic material.

7. A process according to claim 6, wherein said reinforcing member is deposited on the carrier support before step a3).

8. A process according to claim 7, wherein in step a1), a first part of the thermoplastic material is deposited on the carrier support, then the reinforcing member is deposited on said first part of the thermoplastic material, and then a second part of the thermoplastic material is deposited on the reinforcing member.

9. A process according to claim 5, wherein said reinforcing member is placed in the cavity of the mold before the thermoplastic material is deposited in the cavity of the mold.

10. A process according to claim 5, wherein said reinforcing member is introduced in the cavity of the mold after step a3) but before step b).

11. A process according to claim 5, wherein said carrier support is a tray, and wherein said tray is the reinforcing member having a laminar shape.

12. A process according to claim 11, wherein the reinforcing member, along with the thermoplastic material, is overturned approximately 180 degrees about an approximately horizontal axis between step a1) and step a3).

13. A process according to claim 11, wherein the reinforcing member, along with the thermoplastic material, is turned between step a1) and step a3) such that it has a position perpendicular to a closing direction of the mold.

14. A process according to claim 5, wherein the reinforcing member has a structure in the form of mesh.

15. A process according to claim 5, wherein the reinforcing member comprises a plurality of through holes.

16. A process according to claim 5, wherein the reinforcing member comprises on at least one surface a plurality of non-through holes.

17. A process according to claim 5, wherein the reinforcing member is pre-heated before coming into contact with the thermoplastic material.

18. A process according to claim 1, wherein the cavity of the mold further comprises positions for integrating additional members into said product.

19. A process according to claim 1, wherein at least one lining layer is introduced in the mold before step b), such that it is an integral part of the obtained product and such that it covers at least one part of a face of the obtained product.

20. A process according to claim 19, wherein the lining layer includes a reinforcing layer that is embedded within the obtained product.

21. A process according to claim 1, further comprising the step of, after step c), trimming excess material from the obtained product.

22. A process according to claim 1, wherein in step a1), the amount of thermoplastic material that is deposited on the carrier support is controlled.

23. A process according to claim 22, wherein in step a1), the amount of thermoplastic material that is deposited on the carrier support is controlled such that more thermoplastic material per surface unit is deposited in at least one area of the carrier support than in another area of the carrier support.

24. A process according to claim 22, wherein the cavity of the mold is configured such that the thermoplastic material forms at least one functional member in step b).

25. A process according to claim 24, wherein said at least one functional member includes at least one fixing turret.

26. A process according to claim 24, wherein said at least one functional member includes at least one cable fixing clamp.

27. A process according to claim 24, wherein said at least one functional member includes at least one reinforcing member.

28. A process according to claim 24, wherein said at least one functional member includes at least one impact absorption structure.

29. A process according to claim 1 for obtaining a member for an automobile.

30. A process according to claim 29, wherein said member for an automobile is selected from the group consisting of: a door panel, a rear tray and a pillar trim.

31. The process according to claim 1 further comprising depositing at least one reinforcing member in the cavity of the mold, such that it is an integral part of the obtained product, said reinforcing member having a laminar shape; and wherein said reinforcing member is the carrier support.

32. The process according to claim 31, wherein the reinforcing member, along with the thermoplastic material, is overturned approximately 180 degrees about an approximately horizontal axis between step a1) and step a3).

33. The process according to claim 31, wherein the reinforcing member, along with the thermoplastic material, is turned between step a1) and step a3) such that it has a position perpendicular to a closing direction of the mold.

34. A process for manufacture of thermoplastic resin parts, comprising the steps of:
 a) introducing a thermoplastic material comprising at least one thermoplastic resin in a cavity of a mold;
 b) closing the mold, compressing and distributing the thermoplastic material inside the cavity of the mold;
 c) opening the mold and removing a product, obtained from said thermoplastic material, from the cavity of the mold; wherein
 step a) comprises:
  a1) depositing the thermoplastic material in a softened state on a carrier support, such that the thermoplastic material is distributed on the carrier support in a pattern corresponding to a layout of the product of step c), wherein said pattern is determined by a relative movement between the carrier support and a dispensing member from which the thermal plastic material is deposited;
  a2) moving the carrier support, with the thermoplastic material, towards the cavity of the mold and introducing said carrier support inside the cavity of the mold;
  a3) depositing the thermoplastic material by gravity inside the cavity of the mold;
 wherein said carrier support is a tray, a box or a container, wherein in step a1), the dispensing member is fixed, and wherein the carrier support is moved, by means of a manipulator, with regard to said fixed dispensing member, such that the thermoplastic material is distributed in said pattern corresponding to the layout of the product, or the dispensing member is movable, and wherein the carrier support is moved, by means of a manipulator, in synchronization with the dispensing member, such that the thermoplastic material is distributed in said pattern corresponding to the layout of the product, and wherein in step a1), an amount of thermoplastic material that is deposited on the carrier support is controlled such that more thermoplastic material per surface unit is deposited in at least one area of the carrier support than in another area of the carrier support.

* * * * *